causing it to turn with the shaft. The shaft 8 may pass through a weighted lever 29 to which is attached a hand for turning the ratchet wheel and block when required. This lever however may be dispensed with when the arms and elbows are used.

The block is generally turned by the hands 23 attached to the extremities of the bell crank 24 which turns the ratchet wheel being kept in gear therewith by cords 30 and weights. The bell crank is vibrated by an arm 31 connected to it and to an eye 32 inserted in the rising and falling weight holder V so that as the box iron O is operated the block z is turned at the same time bringing another portion of the unpressed bonnet to the iron as the operation progresses. The sharp edged wheel 26 at the same time turns in a segment groove in a part 33 of the seat 13 for producing a degree of friction required for preventing the friction of the iron turning the hub, wheel, and block on the shaft when rubbing at right angles to the axes of the block.

For pressing the fronts, &c., of bonnets a convex table b Fig. 5 is provided which is fixed in a horizontal position to the head of a post a by having it forked to embrace the post and put on a vertical pin or bolt C projecting from the post a and entering a corresponding aperture in the table b. For pressing fronts when separated from the bodies a horizontal table 34, Fig. 1, or board is provided which is attached by one of its ends to the head of the post 11 by a vertical pin passed through the same into the post and supported at the other end by legs or props 35, said board or table being turned horizontally on the aforesaid pin as required so as to bring it into the most convenient position for the operator.

The frame may be constructed and put together in various ways to suit the views of the constructor.

The hollow pressing box or box iron O may be made with convex or concave sides and ends adapted to the various kinds of pressing required—and have a round pin C projecting from the end thereof entering a round aperture in the counter weighted bar u turning therein as a pivot and plates projecting from the opposite end to secure it to the lever r the whole being cast in one piece except the door.

The block may be turned a greater or a less distance as required by means of adjustable cords and strap e, Fig. 5, attached to the lever f of the reaching or pushing arm g, of the rag wheel and to the rising and falling weight moving on the spindle h and to pins inserted in the post a the lever being also perforated with a number of apertures corresponding with the various changes required in the movement of the lever effected by a change of position of the aforesaid cords. And also the same effect may be produced by means of the connecting rod being connected to the arm of the hub nearer to or farther from the upright spindle and by means of screwing the eyes higher or lower in the arm.

A vibrating and turning table i, Fig. 5, may be placed over a pin C inserted in the head of the post a to adapt itself to the face of the ironer, said table vibrating on the convex table b.

The weight of the hollow heated ironing box or box iron may be suspended to it by a curved rod j passed through an oblong slot in the frame and made to rise and fall as the position of the box o is changed instead of having the weight to rise and fall over a vertical spindle as before described. It also admits of a horizontal movement by passing the rod through an inverted hollow conical turning box K inserted in the frame. The ratchet wheel may also be dispensed with and a grooved pulley l cord and weight m substituted—the grooved pulley l having handles n radiating from the same and attached to the shaft and block in the manner before described. This is a more simple arrangement but is not so efficacious. A hook might also be fastened to the table and made to embrace the rod to which the weight is appended for retaining it in a vertical position. And a ratchet wheel and band may be combined with the aforesaid modification.

The seat p, Fig. 6, of the spindle may pass through an oblong opening in the frame and turn on trunnions on the top thereof and be held down by caps and project below the frame and be secured by a horizontal pin in the position desired. The rod j of the weight may have a pin q passed through it under the frame to act as a fulcrum of the lever in pressing. Stands and supports may be placed on the spindles for elevating the blocks.

The ends of the connecting rod of the hands which is turned at right angles may enter an eye or eyelet attached by a loose cord to the weighted platform so as to cause the hands to act on the ratchet wheel in raising or lowering the end of the lever vertically without producing any action on the ratchet wheel in moving it to the right or left. One of the hands may be thrown out of gear whilst the other is in gear. The vertical spindle on which the weight moves may be connected to the weight and move up and down with it instead of the weight moving over the spindle as before described the spindle moving in ears projecting from the frame as represented at Fig. 8.

W. C. PAGETT.
Shovel-Plow.
No. 2,818.  Patented Oct. 17, 1842.
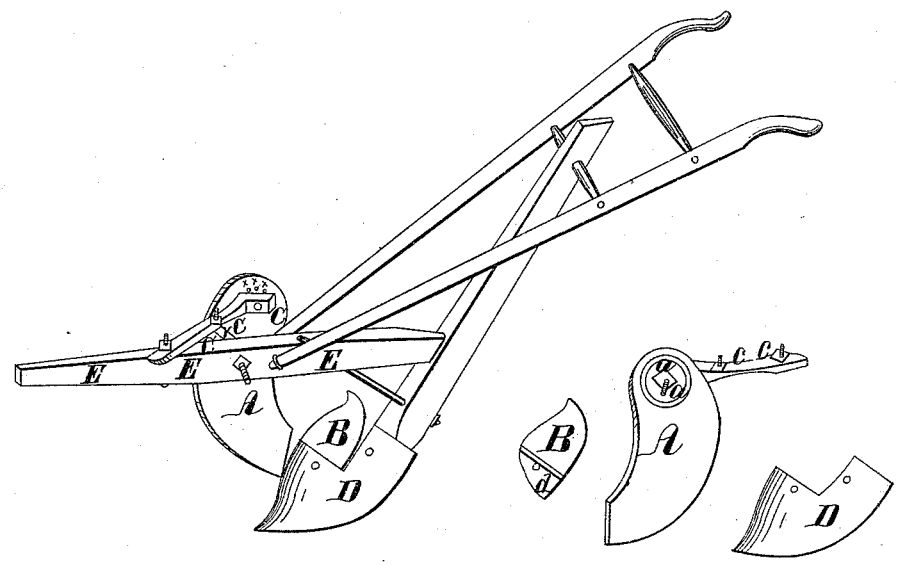

A segment 35, Fig. 1, may be removed from the table or bench corresponding with the curvature of the hat to be pressed which is inserted in the cavity caused by the removal of said segment, the rim resting on